United States Patent [19]

Smith, Jr. et al.

[11] Patent Number: 4,692,178
[45] Date of Patent: Sep. 8, 1987

[54] FILAMENT GATHERING APPARATUS, SYSTEM AND METHOD

[75] Inventors: Henry D. Smith, Jr.; Russell D. Arterburn, both of Athens, Tenn.; John H. Miller, Littleton, Colo.

[73] Assignee: Manville Corporation, Denver, Colo.

[21] Appl. No.: 906,864

[22] Filed: Sep. 15, 1986

[51] Int. Cl.$^4$ .................................... C03B 37/028
[52] U.S. Cl. ................................ 65/2; 65/10.1; 242/18 G; 242/157 R
[58] Field of Search ............ 65/1, 2, 10.1, 11.1; 242/18 G, 157 R

[56] References Cited

U.S. PATENT DOCUMENTS

| | | | |
|---|---|---|---|
| 3,876,404 | 4/1975 | Drummond | 65/2 |
| 3,999,970 | 12/1976 | Barch et al. | 65/2 |
| 4,194,896 | 3/1980 | Symborski et al. | 65/10.1 X |
| 4,344,786 | 8/1982 | Symborski et al. | 65/2 |

Primary Examiner—Robert L. Lindsay
Attorney, Agent, or Firm—John D. Lister; Cornelius P. Quinn; Timothy R. Schulte

[57] ABSTRACT

A wheel assembly, system and method utilizing said wheel assembly are disclosed for directing filaments, strands and the like in such a manner that minimizes the wraparound of such on the wheel assembly. The wheel includes a rotatable, generally disc shaped hub having walls for supporting a plurality of rods about the hub's peripheral edge. The rods are secured to the walls of the hub such that each rod traverses the peripheral edge. The rods are also spaced from one another and arranged so as to define an annular gathering or traveling path upon which said filaments, strands and the like are directed as the wheel rotates. The spacing between the rods is such that the gathering or traveling path is at least 50% discontinuous.

33 Claims, 7 Drawing Figures

U.S. Patent  Sep. 8, 1987  Sheet 1 of 3  4,692,178
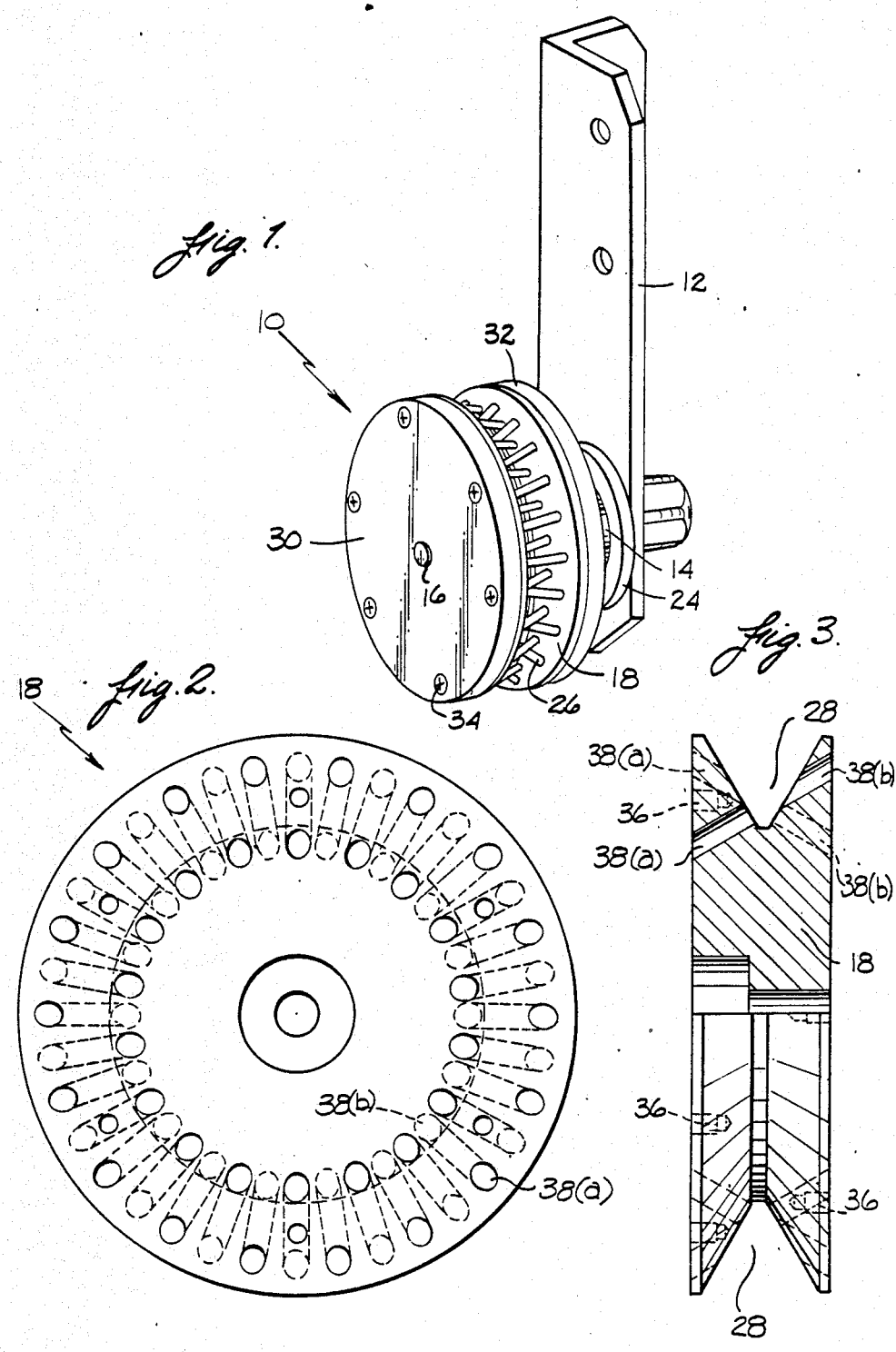

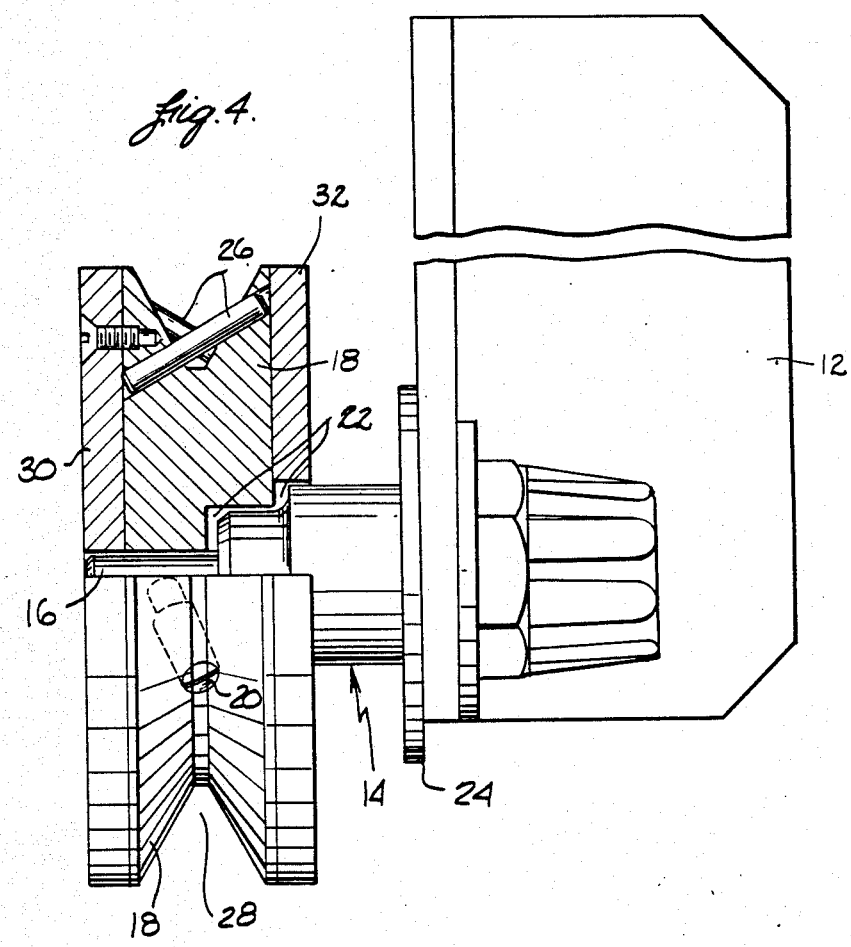

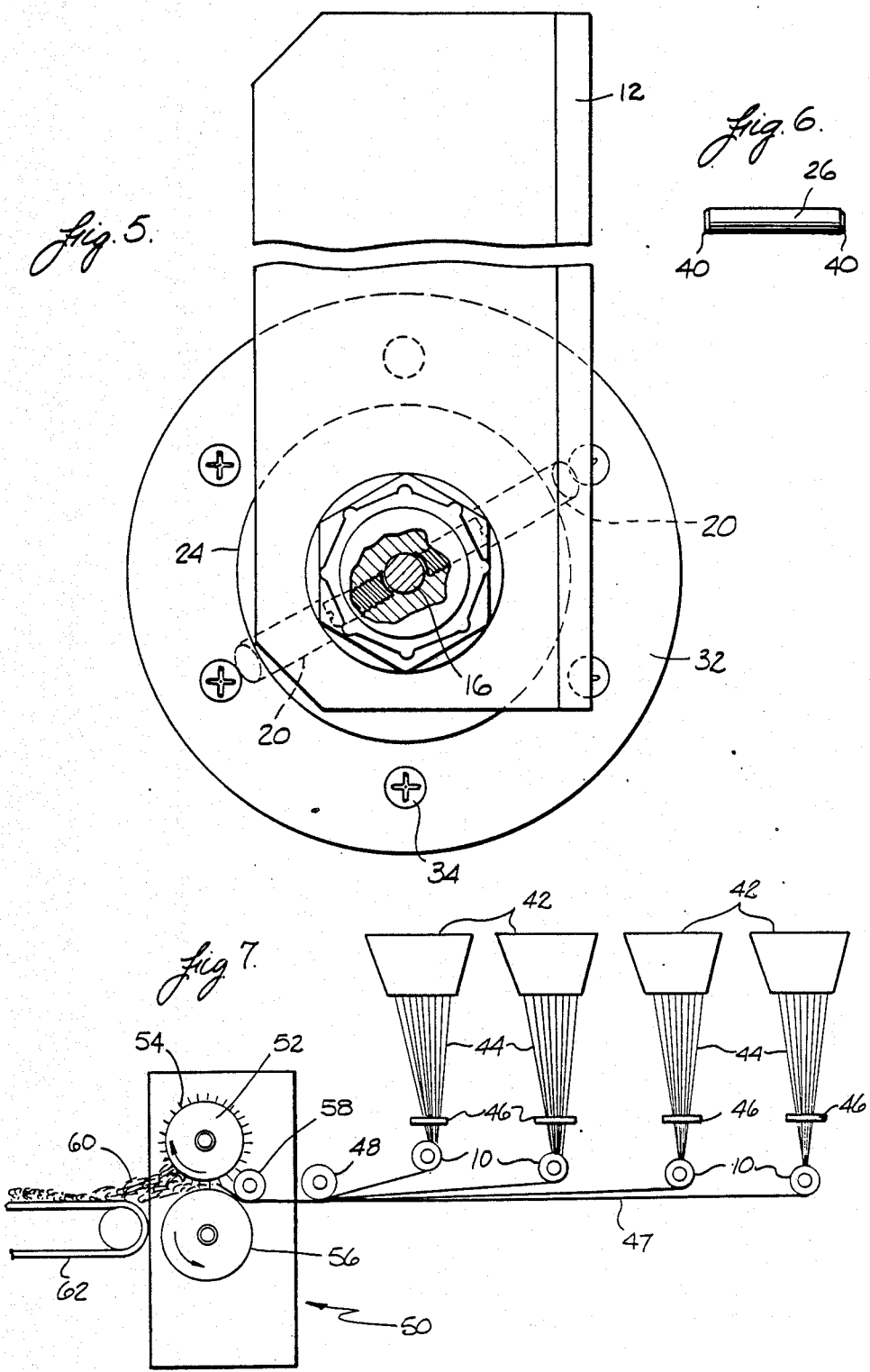

FILAMENT GATHERING APPARATUS, SYSTEM AND METHOD

BACKGROUND OF THE INVENTION

The present invention relates generally to an apparatus for directing filaments, strands and the like. More particularly, the invention relates to a method, system and apparatus all of which utilize a novel wheel apparatus for gathering a plurality of glass filaments into a strand.

Glass fibers or filaments are typically formed today be attenuating a plurality of molten glass streams being drawn through orifices in a glass fiberizing bushing. The filaments are then typically coated with a lubricant binder or sizing composition and gathered into one or more strands by one or more gathering shoes. While various types of gathering shoes or devices are presently being used in the industry, rotating wheel-type shoes are gaining acceptance because they tend to abrade the surface of the strand less than stationary shoes do.

While gaining acceptance, rotating wheels are plagued with what is referred to in the industry as strand wrap-around. Strand wrap-around occurs on the wheel because the filaments tend to stick to the surface of the gathering wheel as the wheel rotates often wrapping many times around the wheel. When this occurs, the attenuation process is interrupted and the filaments have to be removed from the wheel. The process then has to be restarted manually by an operator, which quite obviously is a time consuming task.

U.S. Pat. No. 4,526,598 to Reese et al discusses the strand wrap-around problem and discloses a rotating gathering wheel which is stated to minimize the problem. The wheel has a cylindrical shape and an annular groove with opposing and bottom sides for receiving a plurality of filaments and issuing a bundle or strand of filaments. The annular groove has a plurality of spaced apart radial slots which extend into the center of the shoe for a distance less than the entire radial distance of the shoe. The spacing and number of the spaced apart holes are disclosed as being sufficient to reduce the surface contact area experienced by the filaments and strands by about 20-70% when compared to a shoe with no holes in its gathering surface. This reduced surface contact is stated to reduce the tendency of the filaments and strands to wrap-around the rotating wheel. It is also stated that reductions of less than 20% are generally not enough to noticeably reduce wrapping, while reductions greater than around 70% could result in strand abrasion. While this wheel undoubtedly reduces strand wrap-around in Reese's system (where as illustrated in reese's FIG. 3, the filaments undergo no more than a 30° turn as they travel over the surface of the gathering wheel) Reese's wheel does not work as well in systems wherein the receiving filaments and issuing strands must undergo greater turns, i.e. greater than 30° and thus contact more of the wheel's gathering surface.

U.S. Pat. No. 3,876,404 to Drummond discloses a glass strand traversing apparatus for depositing strand on a forming package wherein the strand makes a significant i.e. estimated to be about 300° turn as it travels on the rotating surface of the apparatus. The traveling surface is composed of a plurality of contact points which the strand engages. The contact points define a plurality of tracks of travel on which the strand rides. Such point contact is stated to minimize contact of the traveling surface with the strand and thus alleviate the problem of strand wrap-around.

As with Reese's wheel, Drummond's traversing apparatus undoubtedly works as intended in the system for which it is designed. However, it's a rather complicated device which would appear to be difficult to assemble and manufacture. It also would appear to wear out rather quickly since the tracks are disclosed as being made of wires which would appear to wear out quickly as the abrasive glass strands traverse the wire's surface. The wire tracks would also be rather difficult to fabricate since each must be produced with a differently shaped, inwardly depressed portion so as to define a nonuniform undulating path for the strands.

Accordingly, while the aforementioned patents reveal that attempts have been made to solve the problem of strand wrap-around, a need still exists for rotating apparatus which not only reduce or minimize the problem of strand wrap-around but also are relatively simple in design and easy to disassemble and reassemble for maintenance purposes.

SUMMARY OF THE INVENTION

The present invention addresses the aforementioned concerns by providing an apparatus, system and method all of which utilize a novel wheel for directing filaments, strands and the like in a manner that minimizes the wrap-around of such on the wheel. The novel wheel includes a rotatable, generally disc-shaped hub which is provided with walls for supporting a plurality of generally cylindrical rods about the hub's peripheral edge. The rods are secured to the walls of the hub such that they traverse the hub's peripheral edge. The rods are further spaced apart from one another and arranged so as to define an annular gathering or traveling path about the hub's peripheral edge. The filaments, strands and the like are directed by or ride upon the gathering or traveling path as the wheel rotates. The spacing between the rods is such that surface contact between the wheel and the filaments and strands will be at least 50% less than it would be with a gathering wheel having a solid or continuous surface for filament gathering. Preferred embodiments of the invention space the rods apart to provide surface contact reductions of more than 70 percent and up to as much as 95 percent.

The present invention also provides an improved system for producing glass strand from heat softenable, fiberizable glass material wherein each strand contains a plurality of glass filaments. The system includes (1) a fiberizing bushing for forming a plurality of glass molten streams, each of which can be attenuated into glass filaments (2) one or more rotatable gathering wheels, each of which gathers a plurality of filaments into a strand and (3) means such as a pull roll or pressure roll for attenuating the molten streams of glass into glass filaments. The system is improved by employing the aforedescribed gathering wheel which not only, as previously mentioned, minimizes strand wrap-around on the wheel but also reduces strand tension, thereby enabling attenuating pressure to be reduced. Reduced strand tension and attenuating pressure are particularly desirable since such results in less fiber damage and breakage. Stress on the components of the attenuating means is also reduced, thereby increasing its service life.

An improved method of producing glass strand from fiberizable glass material which utilizes the aforementioned novel gathering wheel is also provided. The method includes (1) attenuating or drawing a plurality of molten streams into a plurality of glass filaments (2) gathering a plurality of the filaments into a strand with the aforedescribed novel rotating gathering wheel provided by the present invention and (3) collecting the strand with or without other strands. The improved method enables attenuating pressure to be reduced by over 50 percent. The method is also particularly suitable for use in fiberizing systems wherein the filaments undergo more than a 45° turn as they travel over the gathering wheel and are gathered into a strand. Such systems are particularly susceptible to strand wraparound and use of the aforedescribed wheel in such systems virtually eliminated the problem of strand wraparound.

BRIEF DESCRIPTION OF THE DRAWINGS

FIG. 1 is a perspective view of the wheel assembly of the present invention.

FIG. 2 is a front elevational view of the wheel hub depicted in FIG. 1.

FIG. 3 is an end elevational view of the hub depicted in FIG. 2 with diametral cross-section.

FIG. 4 is an end elevational view of the wheel assembly depicted in FIG. 1 with diametral cross-section.

FIG. 5 is a rear elevational view of the wheel assembly depicted in FIG. 1.

FIG. 6 is a side elevational view of a rod of the wheel assembly depicted FIGS. 1 and 4.

FIG. 7 is a schematic view of a chopper fiberizing system of the present invention which employs a wheel assembly of the present invention.

DETAILED DESCRIPTION OF PREFERRED EMBODIMENTS

FIGS. 1-6 illustrate a preferred embodiment of a wheel assembly 10 of the present invention and its respective components. FIG. 1 shows a perspective view of wheel assembly 10 mounted to a support bracket 12 by a spindle bearing 14, the mounting of which is best illustrated in FIG. 4. Spindle bearing 14 is provided with an outwardly extending axially aligned shaft 16 to which the hub wheel 10 (referred to herein as hub 18) is secured by two set screw 20 which are illustrated in phantom in FIG. 5. It can be visualized from FIGS. 4 and 5 that hub 18 is provide with two diametrically opposed holes (not numbered) through which set screws 20 are inserted and threaded to secure hub 18 to shaft 16. While a spindle bearing is illustrated, other means such as air bearings may also be used in accordance with the present invention.

It can also be seen in FIG. 4 that the hub and other various components of wheel 10 (to be described more fully infra) are dimensioned to provide tight clearance identified by numeral 22 between the rotating wheel components and the external surface of spindle bearing 14. Such permits free wheeling of the wheel about the bearing but yet restricts the entry of undesirable material into this area which might interfere with rotation of the wheel. It can also be seen that spindle bearing 14 is secured to bracket 12 by a conventional fastening means such as washer 24 and other conventional components (not numbered) which are well known to those skilled in the relevant art and form no part of this invention.

Wheel 10 (as best illustrated in FIGS. 1 and 4) includes three main components (1) the previously mentioned hub 18 (2) a plurality of rods 26 which are disposed in and about an annular groove 28 which is provided about the entire peripheral edge of hub 18 and (3) front and rear hub covers which are identified in FIGS. 1 and 4 as front hub cover 30 and rear hub cover 32, respectively. The hub covers are secured to the hub by flush mounted screws 34 which are threaded into threaded holes provided in the hub as best illustrated in FIG. 3.

FIGS. 2 and 3 provide front and end views, respectively, of wheel hub 18. It can be seen in FIGS. 2 that hub 18 is disk-shaped. In FIG. 3 it can be seen that annular groove 28 is generally V-shaped and that it extends around the entire peripheral edge of the hub. It can also be seen in FIGS. 2 and 3 that hub 18 is provided with a plurality of holes 38$a$ and $b$ which are axially aligned so as to extend from and through the front surface of the hub, to and out through the rear surface of the hub and also through the opposing walls of the hub defining annular groove 28. Holes 38$a$ and $b$ are also provided with a diameter that compliments the outside diameter of a rod 26 so that a rod 26 may be easily inserted into holes 38$a$ and $b$ and yet fit snugly therein. FIG. 4 provides a view of a rod 26 having been inserted into holes 38$a$ and $b$ in accordance with the present invention. A close look at FIG. 4 will reveal that another rod 26 is located behind the rod which first appears. However, it can be seen that this rod is disposed in the groove at an angle which is opposite that of the first rod. This alternating arrangement of disposing successive rods in the annular groove at equal but opposite angles is continued throughout the annular groove to provide the alternating arrangement of rods depicted in FIG. 1. With this alternating arrangement, those skilled in the relevant art will appreciate that the rods define an annular V-shaped path upon which a plurality of filaments are gathered into a strand as the wheel rotates. While each rod is depicted in the drawings as being at an angle which is opposite but equal to the rod it succeeds, there may be applications where it is desirable to use different angles, even compound angles. For example, if the attenuating means is oriented such that it causes the filaments to ride along the rods defining one side of the V-shaped groove it may be desirable to correct this by providing the rods along this side with a different angle.

Returning to FIGS. 2 and 3 it can be seen that holes 38$a$ and $b$ for housing rods 26 are provided along the entire periphery of hub 18. In the embodiment illustrated, 36 sets of holes 38$a$ and $b$ are provided which translates into a radial spacing of rods every 10 degrees. This particular spacing between the rods has been found to reduce surface contact between the glass filaments and wheel surface in a fiberizing system such as that illustrated in FIG. 7 (described infra) about 80 to 85% from what it would be with a gathering wheel having a solid or continuous surface for filament gathering. As used herein, surface contact reduction will be referred to as providing a gathering path which is discontinuous. Accordingly, a surface contact reduction of 85% will provide a gathering path which is 85% discontinuous.

While the gathering surface of the present invention is highly discontinuous, glass filament travel across the rods will, in time, wear down the surface of the rods somewhat causing surface contact between the filaments and rods to increase (and thus gathering path discontinuity to decrease). Eventually the rods will have to be replaced or rotated (both of which are quite easy and will be described in more detail infra.) Testing with a wheel similar to that illustrated in a fiberizing system such as that illustrated in FIG. 7 indicated that significant reductions in strand wraparound can be obtained in accordance with the present invention with rods spaced to provided a gathering path which remains between about 70 and 95% discontinuous throughout its useful life. Optimum results should be available with a wheel similar to that illustrated wherein, as previously mentioned, the rods are spaced 10 degrees apart which will provide a gathering path which remains between about 75 and 85% discontinuous throughout its useful life. There may be other applications besides glass fiberizing where it may be desirable to utilize the alternating rod arrangement of the present invention to provide a gathering or traveling path which is as low as 50% discontinuous. Lower discontinuities would not appear to be practical since a surface providing such would most undoubtedly require such a large number of closely spaced rods that its cost would be prohibitive. Moreover, such a surface would not appear to be of much value in reducing strand wraparound since such generally increases as gathering path discontinuity decreases.

Returning now to FIG. 4, it can be seen that two rods 26 are secured in their respective holes by front and rear hub covers 30 and 32. Rods 26, one of which is shown in isolation in FIG. 6, are as previously mentioned, dimensioned to fit snugly within holes 38a and b. Part of this dimensioning includes providing rods 26 with a predetermined length that will enable the rods to contact and frictionally engage the inner surfaces of the front and rear hub covers when the hub covers are tightly secured to the hub. Frictional engagement between the rods cylindrical ends and the inner surfaces of the hub covers may be increased by providing each end of the rods 26 with a beveled portion 40. By properly angling beveled surfaces 40, the entire beveled surface can be in frictional engagement with the inner surface of the hub covers. Such frictional engagement, as illustrated, will generally be sufficient to prevent rods 26 from rotating within their respective holes 38a and b which could be caused by the gathering filaments as they are pulled across the rods' surface.

While rotation of the rods within their respective holes is believed to be generally undesirable, there may be applications where it is desirable to permit such rotation. This can be accomplished quite easily in accordance with the present invention by decreasing frictional engagement between the engaging surfaces of the rod, holes 38a and b and inner surfaces of the hub covers. Such reduced frictional engagement can be provided in a variety of ways, for example, by dimensioning the rods such that they fit snugly in holes 38a but yet are capable of turning or rotating within the holes, by fabricating the rods out of materials which facilitate rotation such as graphite or by using other means well known to those skilled in the relevant art.

In view of the aforementioned description of wheel 10, those skilled in the art will appreciate the ease with which rods 26 of wheel 10 can be replaced. It will be appreciated that wheel 10 does not even have to be removed from shaft 16 or spindle bearing 14. In fact, it doesn't even have to be removed from bracket 12. Easy access to rods 26 in accordance with the present invention is provided by removing front hub cover 30 which is easily accomplished by removing screws 34 securing the front hub cover to the hub. Once the front hub cover is removed, all rods requiring replacement can be easily removed by pulling them out of their respective holes through the hole's entrance which opens through the front surface of hub 18. If a rod, for some reason, is lodged in its respective hole it may be necessary to use more force to remove the rods. However, removal should still be relatively easy since it can still be easily reached, for example, by grabbing that portion of it which is exposed in an annular grove 28 with a pair of needle nosed pliers. If necessary, the rear hub cover can also be removed thereby enabling the rod to be easily tapped out of its respective holes. In some cases, an operator inspecting the rods may find that some of them do not need to be replaced. He may find that the underside surface of the rod facing the annular groove's bottom is not worn down and thus still usable. Accordingly, this surface may be used by merely rotating the rod so that this surface of the rod faces upwardly and forms part of the filament gathering path. After the rods have either been replaced or rotated to expose their unused surfaces, those skilled in the art will appreciate that the wheel can be quickly put back into use by simply putting the hub covers back on the hub which in most cases will only be the front hub cover 30. Accordingly, those skilled in the art will appreciate the present invention provides a gathering wheel which not only significantly reduces strand wrap-around but is also easily disassembled and reassembled therby making maintenance easy.

FIG. 7 diagramatically illustrates a glass fiberizing chopper system employing the gathering wheel assembly of the present invention. Numerals 42 designate four fiber forming or fiberizing bushings into which molten glass has been delivered. Although only four bushings are shown, those skilled in the art will understand that more bushings, often as many as 12 to 14, can be and are typically employed in the industry. Numeral 44 identifies the plurality of filaments which are extruded through orifices in the bushings and are drawn over sizing applicators 46 to four gathering wheels 10 of the present invention, each of which gathers the filaments being extruded from its respective bushing into a strand 47. A guide wheel 48 is also shown which guides the strands 47 to a chopper 50. Chopper 50 includes a cutter roll 52 which is rotationally mounted on the chopper frame and carries a number of blades 54 at spaced intervals on the circumference of the roll. A back-up roll 56 is also rotationally mounted on the chopper frame to coact with the blades of the cutter roll. The cutter roll and back-up roll rotate in opposite directions to exert a pulling force on the strand moving through the chopper. An idler or pressure roll 58 also typically is mounted to exert pressure against the back-up roll just forward of the cutting nip, the idler roll and the back-up roll acting as a pair of pull rolls to pull the filaments from the bushings into the chopper. The speeds at which strands 47 travel are very high typically in the range of 2,000 to 6,000 feet per minute. After being chopped strands 47 now identified by numeral 60 are hurled onto a conveyor belt 62 or other suitable collecting device for transportation to another station. While FIG. 7 illustrates a chopper 50, those skilled in the relevant art will appreciate that the present invention is ammenable to other types of strand collecting devices such as winders which wind the strands into a forming package on a mandrel.

When the novel wheel assembly of the present invention is employed as a filament gathering wheel 10 in a glass strand forming operation such as that illustrated in FIG. 7, rods 26 of the gathering wheel preferably form a V-shaped gathering path such as that illustrated throughout the figures. A V-shape is preferred since it draws the gathering filaments together into a strand as the wheel rotates.

Each gathering wheel 10 (as employed in the fiberizing system illustrated in FIG. 7) is also preferably free wheeling since a free wheeling wheel generates less friction between the wheel and gathering filaments and thereby reduces strand tension, the benefits of which are discussed infra. Accordingly, there should generally be no reason to motorize gathering wheel 10 when it is used in a fiberizing system such as that illustrated in FIG. 7. There may, however, be applications where it is desirable to motorize the wheel.

Testing of a wheel assembly similar to that illustrated in a chopper system (also similar to that illustrated) significantly reduce the number of strand wrap-around occurrences which applicants had been experiencing. Strand wrap-around had been quite a serious problem. In applicant's chopper system the gathering filaments have to make contact with a significant portion of the gathering wheel surface (i.e. they make approximately a 90° turn) as they travel over the surface of the gathering wheel (See FIG. 7). Accordingly, when making such contact strand wrap-around is likely to occur, certainly much more likely to occur than it would be where the filaments only have to make a 30° turn since in such situations the filaments, quite obviously, contact much less of the wheel's surface.

In addition to virtually eliminating strand wrap-around, the gathering wheel assembly of the present invention also reduces strand tension, thereby enabling attenuating pressure to be lowered by more than 50%. For example, it was possible in a fiberizing system similiar to that illustrated in FIG. 7 to actually reduce idler roll pressure from over 70 lbs. to less than 30 lbs. on one particular application without experiencing excessive idler roll vibration. Idler roll vibration is undesirable because it can cause slippage of the strand against the idler roll which can result in damage to the fiber surface and fiber breakage. High strand tension can also cause much damage. Furthermore, by reducing strand tension and attenuating pressure, strain on the attenuating means (i.e. winder or chopper) will be reduced. Accordingly, the attenuating means will experience less wear and its service life will be increased.

In addition, less binder throw off was observed. It is believed that the highly discontinuous path provided by the rods of the present invention strips less of the binder or sizing composition from the filament surface as the filaments travel over the rods.

The wheel assembly illustrated in the figures and tested in a chopper fiberizing system substantially similar to that illustrated in FIG. 7 had a diameter of approximately 4⅛ inches. The V-shaped annular groove in the wheel's hub had a 60° included angle and the hubs width was 1 inch. The holes for housing the rods intersected the front and rear hub surfaces at a 60° angle and the holes had a 0.188 to 0.190 inch diameter. The rods had a slightly smaller outside diameter ranging between about 0.187 and 0.185 inches. The length of each of the rods was 1-and 1/32 inches and each rod had a 1/32 inch by 45° camfer on both ends. The rods were made from either naval brass or metallized graphite; however, those skilled in the relevant art will recognize that the rods could be made from a number of suitable materials such as ceramic materials or linen phenolics such as Micarta which is a trademark of Westinghouse Inc. of Pittsburgh, Pa. The hub covers had a diameter of 4⅛ inch inches and a width of ¼ inch. While the tested wheel hub was, as that illustrated, one piece, it could have been made from two or more sections. Both the wheel hub and hub covers were made from a water resistant plastic called "Delrin" which is a trademark of DuPont Inc. of Wilmington, Del. Inc. Other materials such as steel could have been used but plastics are preferred in fiberizing systems because of their lightweight. Lightweight wheels have less momentum than heavy wheels and thus will stop spinning sooner when a strand breakout occurs. Accordingly, a lightweight wheel will wrap less strand around itself than a heavy wheel will when a strand breakout occurs. With less strand wrapped around it, a lightweight wheel will be much easier to clean. Plastic may also be desirable because it can be injection molded. This would make it possible to injection mold the wheel assembly, thereby making it possible to manufacture an entirely integral, one-piece wheel assembly or, if desired, various sections of the assembly, such as half sections, could be molded separately.

While the invention has been described in terms of preferred embodiments, the claims appended hereto are intended to emcompass all embodiments which fall within the spirit of the invention.

What is claimed is:

1. A wheel assembly for directing filaments, strands or the like that minimizes the wraparound of such on the wheel, said wheel comprising: a rotatable, generally disk-shaped hub having walls for supporting a plurality of generally cylindrical rods about the hub's peripheral edge, said rods being secured to the walls of said hub such that each of said rods traverses the peripheral edge, said rods further being spaced apart from one another and arranged so as to define an annular gathering or traveling path upon which said filaments, strands or the like are directed as the wheel rotates, the spacing between the rods being such that said path is at least 50 percent discontinuous.

2. A wheel assembly for gathering a plurality of filaments into a strand comprising: a rotatable, generally disk-shaped hub defining an annular groove about its peripheral edge and a plurality of rods disposed an said groove and secured to the walls of said hub defining said groove, each of said rods traversing said groove and being spaced from each other and arranged so as to define an annular gathering path upon which said filaments are gathered into a strand as the wheel rotates, the spacing between the rods being such that said gathering path is at least 50 percent discontinuous.

3. A wheel assembly as recited in claim 1 wherein each successive rod is arranged so that it traverses the peripheral edge at an angle which opposes that of the preceding rod so as to provide an alternating arrangement of rods which defines a generally V-shaped annular gathering path.

4. A wheel assembly as recited in claim 1 wherein each successive rod is arranged so that it traverses the peripherial edge at an angle which is equal to but opposite that of the preceding rod, said rods and thus their respective angles lying in different planes but all of said planes including the axis about which the hub rotates and all of said planes extending radially therefrom, each of said angles being measured from a line extending radially from said axis, said line also being within its respective angle's plane, the gathering path defined by said rods thereby having a V-shape.

5. A wheel assembly as recited in claim 1 further comprising a shaft about which said hub rotates.

6. A wheel assembly as recited in claim 5 wherein said shaft is attached to a spindle bearing.

7. A wheel assembly as recited in claim 1 further comprising annular front and rear hub covers, said hub covers facilitating the securement of said rods to said hub.

8. A wheel assembly as recited in claim 1 having been made by a molding or casting process wherein the hub and rods are an integral, one-piece structure.

9. A wheel assembly as recited in claim 1 wherein the rods are spaced approximately 10° apart.

10. A wheel assembly as recited in claim 1 wherein the rods define a gathering path which is between 70 and 95 percent discontinuous.

11. A wheel assembly as recited in claim 1 wherein the rods define a gathering path which is between about 75 and 85 percent discontinuous when new.

12. A wheel assembly as recited in claim 1 wherein securement of each rod to the hub is facilitated by locating the ends of the rod into holes provided in the walls of the hub, said securement being such that one end of a rod is located in a hole provided in the wall on one side of the hub and the other end of the rod is located in a hole provided in the wall on the other side of the hub, said holes for each rod being generally cylindrical, axially aligned and dimensioned such that said rod will fit snugly in said holes.

13. A wheel assembly as recited in claim 12 wherein said rod fits snugly in said holes but yet is capable of turning or rotating within said holes when subjected to the forces resulting from filament travel across the rod's surface.

14. A wheel assembly as recited in claim 12 wherein the holes extend through the hub walls so as to facilitate insertion of the rods into their respective holes, said wheel further comprising annular front and rear hub covers for covering the holes such that when the covers are secured to the hub the ends of said rods will be frictionally engaged by the hub covers.

15. A wheel assembly as recited in claim 14 wherein the hub covers frictionally engage the rod ends but not so much so as to prevent the rods from being capable of turning or rotating in their holes when the rod is subjected to forces resulting from filament travel across the rod's surface.

16. In a system for producing one or more strands each containing a plurality of filaments of heat softenable, fiberizable glass material, said system including a fiberizing bushing for forming a plurality of glass molten streams, each of which can be attenuated into glass filaments, one or more rotatable gathering wheel assemblies, each of which gathers a plurality of filaments into a strand and a means for attenuating the molten streams of glass into said filaments, an improvement comprising one or more rotatable gathering wheel assemblies, each wheel assembly including a rotatable, generally disk-shaped hub having walls for supporting a plurality of generally cylindrical rods about the hub's peripheral edge, said rods being secured to the walls of said hub such that each of said rods traverses the peripheral edge, said rods further being spaced apart from one another and arranged so as to define an annular gathering path upon which said filaments are gathered as the wheel rotates, the spacing between the rods being such that said path is at least 50 percent discontinuous, said gathering path reducing filament and strand wrapping about the wheel since the discontinuous surface results in reduced surface contact between the filaments and strands and the wheel.

17. A system as recited in claim 16 wherein the system components are arranged so as to cause the filaments being gathered into strands to undergo at least a 45 degree turn as they travel over the gathering wheel's path.

18. A system as recited in claim 17 wherein the filaments undergo at least a 70 degree turn.

19. A system as recited in claim 17 wherein the filaments undergo about a 90 degree turn.

20. A system as recited in claim 18 wherein the rods are arranged so that each successive rod traverses the groove at an angle which is equal to but opposite that of the preceding rod, said rods and thus their respective angles lying in different planes but all of said planes including the axis about which the hub rotates and all said planes extending radially therefrom, each of said angles being measured from a line extending radially from said axis, said line also being within its respective angle's plane, the gathering path defined by said rods thereby having a V-shape.

21. A system as recited in claim 16 wherein the rotatable gathering wheel assembly is free wheeling.

22. A system as recited in claim 16 wherein the gathering path defined by the rods forms a V-shaped annular path for filament gathering.

23. A system as recited in claim 16 wherein the rods define a gathering path which is between about 50 and 95 percent discontinuous.

24. A system as recited in claim 16 wherein the rods define a gathering path which is between about 70 and 90 percent discontinuous.

25. A system as recited in claim 16 wherein the rods define a gathering path which is betwen about 80 and 95 percent discontinuous.

26. A method of producing glass strand from heat softenable, fiberizable glass material comprising: (a) drawing or attenuating glass filaments from molten streams of glass through use of an attenuation means, (b) gathering a plurality of filaments into a strand on a rotatable, gathering wheel assembly, said gathering wheel assembly including a rotatable, generally disk-shaped hub having walls for supporting a plurality of generally cylindrical rods about the hub's peripheral edge, said rods being secured to the walls of said hub such that each of said rods traverses the peripheral edge, said rods further being spaced apart from one another and arranged so as to define an annular gathering path upon which said filaments are gathered as the wheel rotates, the spacing between the rods being such that said path is at least 50 percent discontinuous, said discontinuity reducing the wrapping of glass filaments and strand about the gathering wheel by reducing surface contact between the filaments and strand and the wheel; and (c) collecting said strand with or without other strands.

27. A method as recited in claim 26 wherein the gathering path is between about 70 and 95 percent discontinuous.

28. A method as recited in claim 26 wherein the rods form a V-shaped gathering path.

29. A method as recited in claim 26 further comprising chopping the strands.

30. A method as recited in claim 26 wherein the filaments being gathered into a strand undergo at least a 45 degree turn as they travel about the gathering wheel.

31. A method as recited in claim 30 wherein the filaments undergo at least a 70 degree turn.

32. A method as recited in claim 33 wherein the filaments undergo about a 90 degree turn.

33. A method as recited in claim 26 wherein the pressure required for filament attenuating is less than half of what it would be with a gathering wheel having a solid continuous gathering path.

* * * * *

UNITED STATES PATENT AND TRADEMARK OFFICE
CERTIFICATE OF CORRECTION

PATENT NO. : 4,692,178
DATED : September 8, 1987
INVENTOR(S) : Henry D. Smith, Jr., Russell D. Arterburn
John H. Miller It is certified that error appears in the above—identified patent and that said Letters Patent is hereby corrected as shown below:

Claim 2, line 4, delete "an" and insert --in--

Signed and Sealed this

Nineteenth Day of April, 1988

Attest:

DONALD J. QUIGG

Attesting Officer     Commissioner of Patents and Trademarks